United States Patent Office 2,883,620
Patented Apr. 21, 1959

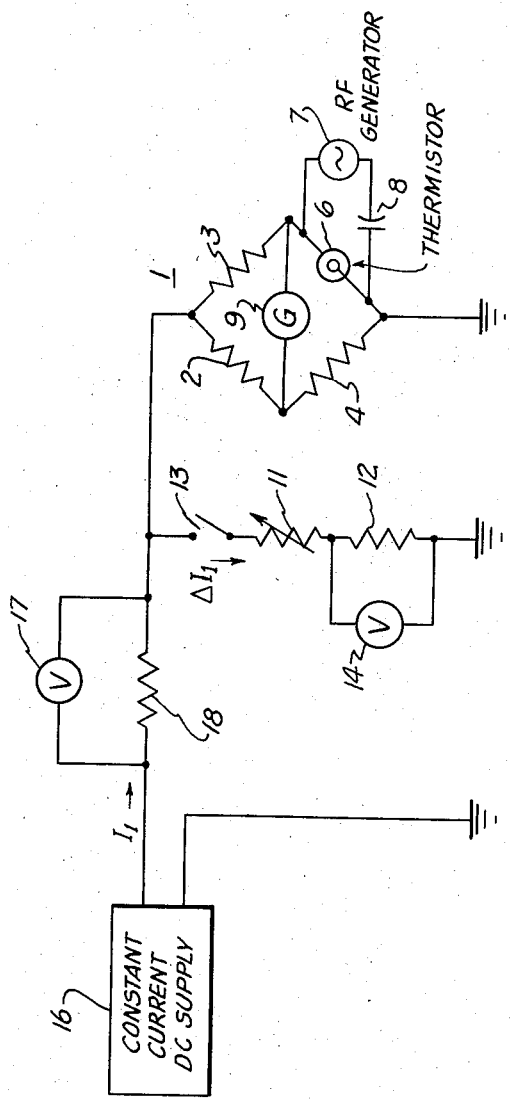

2,883,620

HIGH FREQUENCY POWER MEASURING BRIDGE CIRCUIT

Myron C. Selby, Charles M. Allred, Paul A. Hudson, and Ira S. Berry, all of Boulder, Colo., assignors to the United States of America as represented by the Secretary of Commerce Application September 6, 1957, Serial No. 682,560

3 Claims. (Cl. 324—106)

This invention relates to R-F or microwave power measurements and more particularly is concerned with a bridge including a temperature-sensitive thermistor or bolometer mount for measuring low-level R-F power.

Resistance-type bridges have been used almost exclusively for the measurement of low-level R-F powers for the past several years. As compared with calorimetry equipment, bridges have the advantage of high sensitivity, fast response and higher accuracy. Prior art measuring circuits have almost invariably been of the Wheatstone bridge type in one arm of which is included a temperature-sensitive resistor such as a thermistor or barretter. Thermistors have negative temperature coefficients while barretters have generally positive ones. The prior art bridges include a source of low frequency or D.C. bias current having means for varying the magnitude of the current. Since this bias source must be extremely stable, batteries operated under conditions of constant current drain have usually been used. To meet the condition of constant current drain, constant impedance attenuators are generally placed in series with the bridge to vary the bias power. The computation of R-F power is then obtained from the equation $P_{rf}=\frac{1}{4}(I_1^2-I_2^2)R$ for the case of an equal arm bridge, where R is the bridge resistance and $I_1$ and $I_2$ are the total bridge currents before and after the application of R-F power, respectively. The validity of this equation is based on the equivalent heating effect of D.C. power and R-F power when both are dissipated in a purely resistive load.

Batteries as used in the prior art bridges need frequent recharging and/or replacement and constant impedance attenuators are both bulky and expensive. The chief disadvantage, however, is that if the R-F power is small then $I_1-I_2$ may well be of the same order of magnitude as the accuracy with which $I_1$ and $I_2$ are measured. Such a condition can lead to large errors and the only alternative is to use special high sensitivity, low power capacity barretters or thermistors for low power level; thus several elements are necessary to cover the range from microwatts to milliwatts.

The bridge circuit of the present invention avoids the abovementioned difficulties by employing a variable resistance in parallel across the bridge. A conventional constant current D.C. supply source provides a single-valued total current at all times. The bridge is rebalanced by shunting a portion of the bridge current through the parallel variable resistor. The change in current necessary to rebalance the bridge can then be directly measured in the shunt circuit.

It is therefore one object of this invention to provide an improved R-F power measuring bridge.

Another object of this invention is to provide an R-F power measuring bridge in which the change in bridge current may be measured directly.

Still another object of this invention is to provide a simple, inexpensive R-F power measuring bridge having improved accuracy and greater range.

An additional object of this invention is to provide an improved R-F power measuring bridge in which a single thermo-sensitive unit may be used to measure R-F powers over a range of approximately 30 decibels.

A better understanding of the invention can be had with reference to the single figure of the drawing showing the improved R-F power measuring bridge circuit of the present invention.

Referring to the drawing, a conventional Wheatstone bridge indicated generally at 1 includes equal resistance arms 2, 3, and 4. The fourth arm of bridge 1 contains a thermo-sensitive element 6 which may be in the form of a thermistor or barretter mount. An R-F generator 7 supplies high-frequency energy to element 6 through a coupling capacitor 8. Bridge balance may be detected by a galvanometer 9 connected across two arms of the bridge.

Connected in parallel with bridge 1 are a pair of series resistors 11 and 12. Adjustment of the variable resistor 11 controls the amount of current shunted around bridge 1. A switch 13 provides means for disconnecting resistors 11 and 12 from the remainder of the circuit. The magnitude of the shunt current flowing through resistors 11 and 12 may be measured by voltmeter 14 connected across measuring resistor 12.

Bias current for bridge 1 is derived from a constant current D.C. supply 16. Source 16 maintains a steady flow of constant magnitude current at all times. The magnitude of this current is measured by means of a voltmeter 17 connected across a second measuring resistor 8 in series with the D.C. supply source.

In operation the bridge is first balanced by varying the current $I_1$ from the constant current source 16. When bridge 1 is balanced, the current from source 16 is set and remains constant throughout the remainder of the measuring period. During this original balancing operation switch 13 in the shunt circuit is open so that the shunt current $\Delta I_1$ is zero. The R-F power to be measured from R-F generator 7 is then fed into the temperature-sensitive element 6 with switch 13 in the closed position. Shunt resistor 11 is then adjusted until the bridge is rebalanced. The two currents $I_1$ and $\Delta I_1$ may be measured on voltmeters 17 and 14, respectively, and the R-F power may then be simply computed.

By using a constant current bias source 16 the shunt current $\Delta I_1$ is exactly equal to the differential current $(I_1-I_2)$ in the equation as given above for computing R-F power. This shunt current may be measured directly to the desired degree of accuracy regardless of the magnitude of the current $I_1$. The power equation $$P_{rf}=\tfrac{1}{4}(I_1^2-I_2^2)R$$

is used in the factored form $P_{rf}=\frac{1}{4}(2I_1-\Delta I_1)\Delta I_1 R$ where $\Delta I_1=(I_1-I_2)$. The shunt current $\Delta I_1$ can be substituted directly into the equation. In this way a single high-power thermistor, for example, can be used to cover the range from about 10 microwatts to around 100 milliwatts of radio frequency power.

Constant current supply source 16 may be any of the well-known constant current D.C. generators. A special electronically regulated power supply has been constructed having a regulation of one part in $10^5$ for load variations from 0 to 100 ohms with a stability of plus or minus one part in $10^5$ per hour. With this source and using a thermistor for temperature-sensitive element 6, R-F lower levels from 100 milliwatts down to 100 microwatts have been measured with respective accuracies of 0.05 to 5%.

A low-cost bridge with reduced accuracy may be constructed by substituting a resistor having a value of about 100 times that of the bridge resistance for the constant current control circuit. In such a modification a large resistor is placed in series with the bridge and fed from a conventional voltage regulated power supply. In this case changes in the shunt resistance from zero to infinity will result in a maximum change of total bridge current $I_1$ of only 1%.

As can be seen, the present invention provides a novel inexpensive bridge circuit for measuring low-level, high-frequency power limited in frequency range only by the frequency limitations of a thermistor or bolometer mount. Expensive batteries and constant impedance attenuators are eliminated through the use of a shunt circuit making it possible to measure directly the differential current involved in rebalancing the bridge. The design of this bridge circuit readily permits incorporating a self-balancing feature by having the amplified output of the bridge control the amount of shunt current. Improvement over present day commercial bridges is about 10 to 1 in power range and as much as 100 to 1 in percentage accuracy with the greatest improvement at low power levels.

It will be apparent that the embodiment shown is only exemplary and that various modifications can be made in construction and arrangement within the scope of invention as defined in the appended claims.

What is claimed is:

1. A high-frequency power measuring circuit comprising an electrical balancing bridge having a variable impedance in one arm sensitive to high-frequency energy, a constant direct-current source connected to said bridge for supplying a bias current of fixed amplitude, means for applying the high-frequency energy the power of which is to be measured to said sensitive impedance to produce unbalance in said bridge, means for varying the amount of said fixed-amplitude bias current applied to said bridge comprising variable shunt impedance means connected across said bridge and said constant direct-current source for restoring the balance of said bridge, and means for measuring the current flow through said shunt impedance means.

2. The invention of claim 1 in which said balancing bridge is a Wheatstone bridge and said variable impedance arm comprises a thermal-resistive resistor.

3. The invention of claim 2 in which said variable impedance arm is a thermistor.

References Cited in the file of this patent

UNITED STATES PATENTS

| | | |
|---|---|---|
| 2,415,823 | Houghton | Feb. 18, 1947 |
| 2,417,820 | Ginzton | Mar. 25, 1947 |
| 2,611,795 | Carlin | Sept. 23, 1952 |